May 25, 1943.   L. D. DANFORTH   2,320,030
DIAPHRAGM LOCK NUT
Filed Dec. 30, 1940   2 Sheets-Sheet 1

INVENTOR.
Louis D. Danforth
BY

May 25, 1943.   L. D. DANFORTH   2,320,030
DIAPHRAGM LOCK NUT
Filed Dec. 30, 1940   2 Sheets-Sheet 2
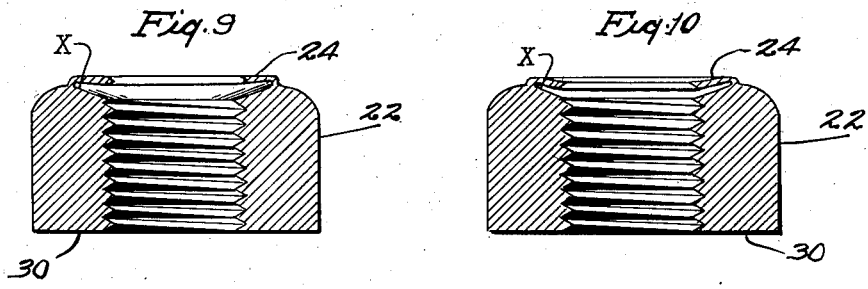
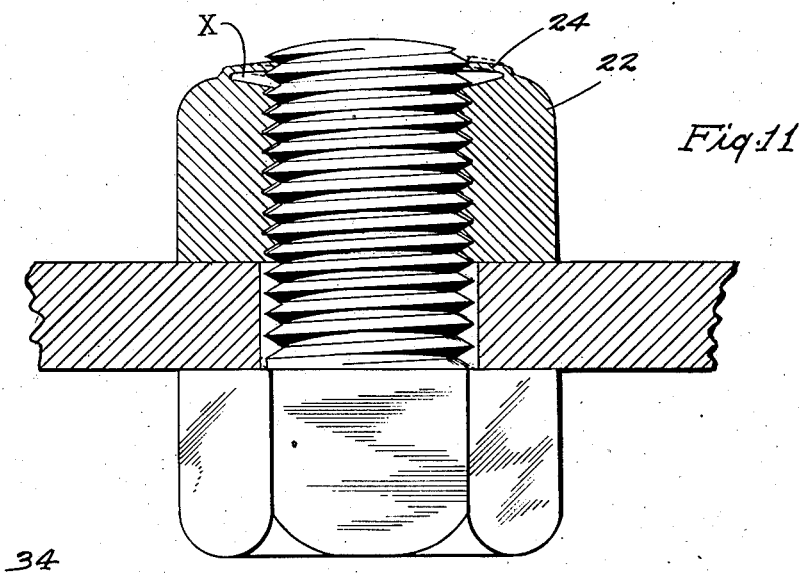
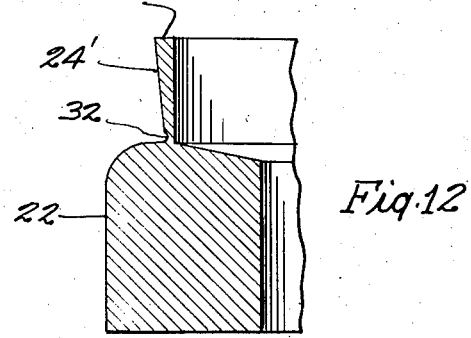
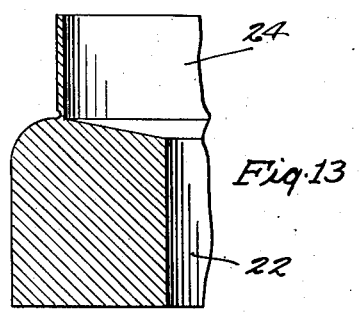
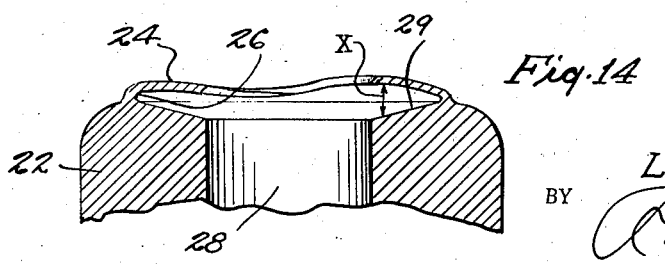
INVENTOR.
Louis D. Danforth
BY Patented May 25, 1943

2,320,030

UNITED STATES PATENT OFFICE 2,320,030

DIAPHRAGM LOCK NUT

Louis D. Danforth, Los Angeles, Calif., assignor of one-twelfth to Samuel Reginald Smith, two-twelfths to G. C. Lambert, three-twelfths to W. Reid Ferguson, four-twelfths to Henry A. Irwin, all of Los Angeles, Calif., and one-sixth to Aero Inventions Inc., Las Vegas, Nev., a corporation of Nevada Application December 30, 1940, Serial No. 372,291

4 Claims. (Cl. 151—21)

The present invention relates to self-locking nuts and as such is particularly adapted to attain any given degree of nut pressure and/or tension, and to maintain such condition under severe vibration, and is likewise adapted to provide a nut which shows a minimum loss of gripping efficiency even after repeated application upon the same threaded bolt.

Many different types of construction have been devised in striving toward the above purposes and such types of construction have included bi-metallic arrangements in varying ratios and of fiber inserts and washers to likewise obtain varying degrees of relative co-efficiencies of friction, but insofar as the applicant is aware none of the prior art has employed a diaphragm integrally formed with the body of the nut and so disposed with respect thereto and with respect to the associated bolt as to provide the following points as objects of the invention.

(1) To reduce axial play to a minimum.

(2) To provide a self-adjusting degree of off-set thread relationship as between the threads in the body of the nut and in the diaphragm thereof as compared with constant thread pitch in the bolt associated with the nut.

(3) To provide a warpable nut element which when threadedly engaged upon a bolt provides a resilient although constantly applied spring pressure which forces and holds the nut securely upon the threads of the bolt.

(4) A mono-metallic nut construction having the aforementioned characteristics whereby possible electrolytic action with accompanying metal deterioration is eliminated.

(5) An all metal construction which is not effected by heat or solvent as may be the case when fiber is employed in a nut as a friction agency.

(6) A nut which considering its several characteristics as to efficiency is readily made and of low cost.

Other objects, features, and advantages of the invention may be observed from the accompanying drawings, the specification, and the subjoined claims.

In the drawings of which there are two sheets:

Figure 9 is a view comparable with Figure 8 excepting that the diaphragm is here shown as being in a horizontal plane rather than being convex as shown in Figure 8.

Figure 10 is a view showing a further modified form of diaphragm construction in that the same is here shown in concave form.

Figure 11 is a utility view showing the nut in functional use and showing the manner in which the threads are forced into pressure contact with the threads of a bolt.

Figure 6:
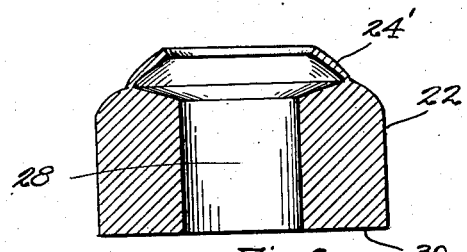
Figure 6 is a transverse sectional elevation showing a still further advance in construction of the nut.

Figure 12 is a fragmental view showing the diaphragm forming collar in section which latter element is of greater thickness adjacent the upper edge thereof whereby threads may be cut therein when over ended as shown in the progressive view in Figure 6, an under cut groove adjacent the body of the nut may be used to facilitate the rolling operation used to place the diaphragm adjacent to the top surface of the nut.

Figure 13 is a variation of Figure 12 in as much as the section of the collar is here shown in constant sectional thickness, a groove is likewise shown adjacent the shoulder of the nut to facilitate bending the collar.

Figure 14 is a fragmental view showing schematically the warp or deformation developed in the diaphragm when a bolt is in threaded engagement with the nut, the warping here shown is utilized to place spring pressure upon the threads of the bolt to aid in securing the nut and bolt in fixed position.

In the drawings the reference character 20 indicates the finished product of this invention which comprises in essential detail a nut having a body portion 22 and having a diaphragm 24. The body portion 22 of the nut is formed in the usual and conventional manner, that is, it is formed of a metal and is provided with a thread best suited to the particular use intended.

Figure 1:
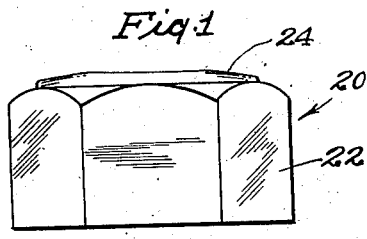
Figure 1 is a side-elevational view showing the nut of this invention.
Figure 3:
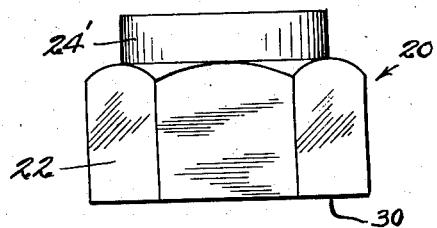
Figure 3 is a side-elevational view showing the nut of this invention during one stage of its construction.
Figure 2:
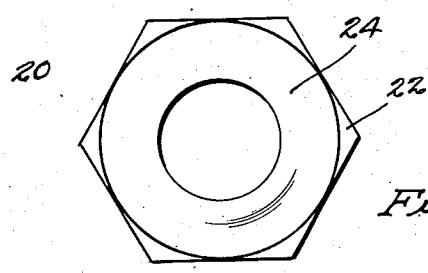
Figure 2 is a plan view thereof.
Figure 4:
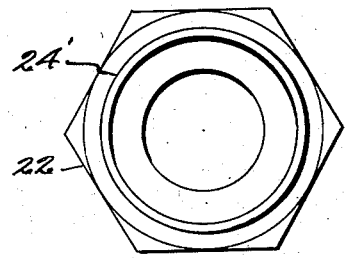
Figure 4 is a plan view of the stage of construction shown in Figure 3.
Figure 5:
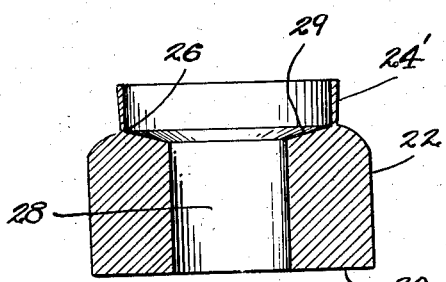
Figure 5 is a transverse sectional elevation showing the nut during a further and more advanced stage of construction.

Positioned inwardly of the outer sides of the nut an annular flange or collar 24 extends vertically from the upper end of the nut and in parallel relation with the longitudinal axis of the nut as shown in Figures 3, 4, and 5, while that surface portion of the nut which lies between the inner root edge 26 of the collar 24 and the bore 28 of the nut is chamfered as shown at 29 in each of the sectional views.

The collar 24 is then turned inwardly toward the longitudinal axis of the nut in such progressive stages and by such tools as may be best suited for the purpose until the collar occupies a position substantially parallel with the base 30 of the nut although in spaced relation to the chamfered surface, and when thus completed forms an apertured diaphragm. With the collar 24 in this position an acute angle X is present between the inner or under side of the collar and the end face 29 of the body 22. This angle clearly appears in Figs. 7 to 11, inclusive. It will be seen that the diaphragm or collar 24 integrally joins the upper end of the nut body 22 at the angle X.

Figure 7:
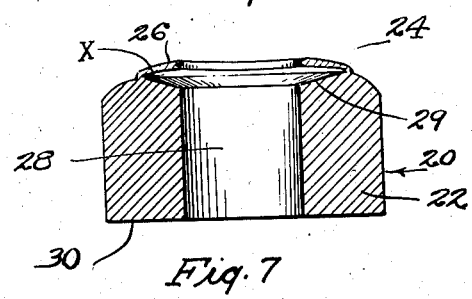
Figure 7 is in like manner a further advance in construction of the nut, in this view the nut is in reality a finished product except for threading and possibly a slight degree of diaphragm compression to develop a requisite degree of off-set thread lead.
Figure 8:
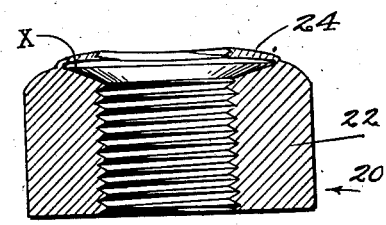
Figure 8 is a sectional elevation showing the finished or completed nut of this invention.

After the diaphragm is thus created as shown in Figure 7 a suitable tap is used to cut threads in the blank form of the nut thus created, the tap being entered from the diaphragm side of the nut will first cut a thread in the diaphragm and continuing will cut other threads in the bore of the nut to complete the threads thereof. Thereafter the diaphragm may be inwardly pressed or bent in such amount as to obtain a predetermined degree of off-set between the terminal thread in the body of the nut and the thread or portion of a thread cut in the diaphragm.

Reference is particularly directed to Figures 12 and 13 which show in detail sections of the collar 24. In Figure 12 the section 24 is formed with an inverted taper and an annular groove 32 is cut in the exterior root base of the collar to facilitate the operation of bending the collar towards the longitudinal axis of the nut, although such groove or scoring is not an absolute necessity. Likewise the relatively great width 34 which receives the threads cut therein when bent over, is not a necessary consideration but is thus shown as a permissible and satisfactory form of construction. Preferably the collar is formed with but slight taper and may be formed with parallel sides in certain instances as is shown in Figure 13. In general, a nut made for ¼ inch bolt would have a collar sectional thickness of approximately $20/1000$ of an inch and while this thickness varies of course with the size of the nut, as a matter of fact such thickness may be said to be of such dimension when turned over as shown in Figure 7 as to carry one or more threads and such thickness includes accretion of sectional thickness due to rolling over the metal of the collar, and such last defined thickness is attested to in Figures 8, 9, 10, 11, and 14, in each of which the diaphragm is shown with one or more full threads cut therein.

It is also to be noted that the diaphragm may be convex in finished configuration, or may be concave as shown in Figure 10, although the preferable form is that of a position parallel with the base of the nut.

Since the diaphragm 24 in its functional relationship with the nut as a whole forms the essence of the invention it is desirable that the several modes by which it may be constructed be enlarged upon in further detail.

In Figure 14 I have undertaken to schematically show the action which takes place in the diaphragm when a bolt enters into threaded relationship with a nut made in conformity with the theory of this invention. It appears that due to the pitch of the thread that a roll or warp is created in the relatively thin wall of the diaphragm and that it is this roll or warp which creates a spring pressure applicable against the threads of the bolt thereby holding the nut in position upon a bolt against loosening by any force except of course axial rotation due to an instrument such as a suitable wrench.

The diaphragm 24 is flexible and resilient. Upon disengagement of the nut from the bolt the resilient diaphragm 24 returns or substantially returns to its original shape or condition. This adapts the nut for repeated use.

It is possible that various changes and modifications and variations may be made in practicing the invention in departure from the particular showing of the drawings and description as given, without however, departing from the true spirit of the invention as defined by the scope of the appended claims, accordingly the present illustration is to be only considered the preferred form of the invention, while the claims are to be considered the measure of the true scope thereof.

I claim:

1. A lock-nut comprising a body portion having a threaded bore and being provided with an integrally connected continuous annular diaphragm, said diaphragm being positioned across the top of the body of the nut and substantially parallel with the base thereof and having a threaded opening in alignment with said bore, said diaphragm having a relatively thin sectional thickness whereby the thread of its opening is in segmental contact with the thread on a companion bolt and the inner portion of the diaphragm is warped adjacent said opening by reason of such segmental contact.

2. A lock nut comprising a body having a threaded opening, a thin walled continuous annular diaphragm integrally joined with an end of the body and extending inwardly toward the longitudinal axis of the body from its line of joinder with the body at an acute angle to the end of the body, the diaphragm having an opening coaxial with the opening of the body, and a thread on the wall of the opening in the diaphragm in out of phase relation to the thread of the body, said out of phase relation causing the thin walled diaphragm to flex at said line of joinder and to warp adjacent its opening when the threads of the body and diaphragm are in cooperation with the thread of a bolt or the like.

3. A lock nut comprising a body having a threaded opening, a continuous annular diaphragm integrally joined with an end of the body and extending directly inward toward the longitudinal axis of the body at an acute angle to said end of the body, the diaphragm having an opening coaxial with the body opening, and a thread on the wall of the opening in the diaphragm in out of phase relation with the thread in the body opening, the diaphragm being thin walled and flexible where it joins the body and around the second named opening to flex where it joins the body and to warp around said second named opening when the nut is threaded with a bolt or the like.

4. A lock nut comprising a body having a threaded opening, a thin walled continuous annular diaphragm integrally joined with an end of the body and extending inwardly toward the longitudinal axis of the body from its line of joinder with the body at an acute angle to the end of the body, the diaphragm being concave in axial cross section and having an opening coaxial with the opening of the body, and a thread on the wall of the opening in the diaphragm in out of phase relation to the thread of the body so that the diaphragm is subject to flexure when the nut is in threaded relationship with a bolt.

LOUIS D. DANFORTH.